United States Patent
Kang et al.

(10) Patent No.: US 10,644,819 B2
(45) Date of Patent: May 5, 2020

(54) CARRIER AGGREGATION CONFIGURATION METHOD AND DEVICE FOR SAME

(71) Applicant: KT CORPORATION, Gyeonggi-do (KR)

(72) Inventors: Seunghyun Kang, Seoul (KR); Minseok Noh, Seoul (KR); Woo-jin Choi, Seoul (KR); Kyujin Park, Seoul (KR); KyungJun Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 59 days.

(21) Appl. No.: 15/501,263

(22) PCT Filed: Jul. 31, 2015

(86) PCT No.: PCT/KR2015/008037
§ 371 (c)(1),
(2) Date: Feb. 2, 2017

(87) PCT Pub. No.: WO2016/021882
PCT Pub. Date: Feb. 11, 2016

(65) Prior Publication Data
US 2017/0222746 A1    Aug. 3, 2017

(30) Foreign Application Priority Data

Aug. 7, 2014 (KR) .......... 10-2014-0101467
Jul. 2, 2015 (KR) .......... 10-2015-0094846

(51) Int. Cl.
| | |
|---|---|
| *H04J 11/00* | (2006.01) |
| *H04L 5/00* | (2006.01) |
| *H04W 16/14* | (2009.01) |
| *H04W 72/04* | (2009.01) |
| *H04B 7/06* | (2006.01) |

(Continued)

(52) U.S. Cl.
CPC ........ *H04J 11/0093* (2013.01); *H04B 7/0626* (2013.01); *H04J 11/0076* (2013.01);
(Continued)

(58) Field of Classification Search
USPC ......................................................... 370/395
See application file for complete search history.

(56) References Cited

U.S. PATENT DOCUMENTS

2006/0023656 A1* 2/2006 Anglin, Jr. .......... H04W 72/005
370/328
2010/0272095 A1* 10/2010 Alberti .................. H04J 3/0602
370/350

(Continued)

FOREIGN PATENT DOCUMENTS

KR   10-2013-0138826 A   12/2013
KR   10-2014-0031203 A   3/2014

OTHER PUBLICATIONS

Fujitsu, "Consideration of LTE in Unlicensed Spectrum", RWS-140028, pp. 1-9.

*Primary Examiner* — Gregory B Sefcheck
*Assistant Examiner* — Majid Esmaeilian
(74) *Attorney, Agent, or Firm* — IP Legal Services, LLC

(57) ABSTRACT

Provided are a method and a device for selecting a channel of an unlicensed band in configuring carrier aggregation for a terminal using an unlicensed band cell which uses an unlicensed frequency band. The method may include: receiving, from a base station, channel candidate information of a secondary cell using an unlicensed frequency band; transmitting channel state information with respect to one or more channels generated using the channel candidate information; and adding, as the secondary cell, a channel selected on the basis of the channel state information by the base station; and a device.

12 Claims, 10 Drawing Sheets

(51) Int. Cl.
  H04L 1/00   (2006.01)
  H04W 16/10  (2009.01)
  H04W 16/24  (2009.01)
  H04W 72/08  (2009.01)

(52) U.S. Cl.
  CPC ............ H04L 1/0026 (2013.01); H04L 5/006 (2013.01); H04L 5/0098 (2013.01); H04W 16/10 (2013.01); H04W 16/14 (2013.01); H04W 16/24 (2013.01); H04W 72/04 (2013.01); H04W 72/0453 (2013.01); H04L 5/001 (2013.01); H04L 5/0035 (2013.01); H04L 5/0048 (2013.01); H04W 72/085 (2013.01)

(56) References Cited

U.S. PATENT DOCUMENTS

| | | | |
|---|---|---|---|
| 2011/0026567 A1* | 2/2011 | Sampath | H04B 1/0032 375/219 |
| 2012/0208541 A1* | 8/2012 | Luo | H04B 7/0626 455/437 |
| 2013/0188552 A1 | 7/2013 | Kazmi et al. | |
| 2013/0195073 A1 | 8/2013 | Chen et al. | |
| 2013/0265984 A1 | 10/2013 | Li et al. | |
| 2013/0294382 A1* | 11/2013 | Xu | H04L 5/0048 370/329 |
| 2013/0336224 A1 | 12/2013 | Davydov et al. | |
| 2014/0043979 A1 | 2/2014 | Etemad et al. | |
| 2014/0051485 A1 | 2/2014 | Wang et al. | |
| 2014/0079015 A1 | 3/2014 | Kim et al. | |
| 2014/0112277 A1 | 4/2014 | Yang et al. | |
| 2014/0375505 A1* | 12/2014 | Anderson | G01S 5/0215 342/464 |
| 2015/0215926 A1* | 7/2015 | Huang | H04W 36/0061 370/329 |
| 2015/0223244 A1* | 8/2015 | Tabet | H04W 72/12 370/329 |
| 2015/0296486 A1* | 10/2015 | Park | H04W 76/025 370/329 |
| 2016/0081029 A1 | 3/2016 | Wang et al. | |

\* cited by examiner

*FIG.1*

| BAND | Frequency (GHz) | Channels | Permitted Use Location | Point-to-Point Max. Intentional Radiator Power *1 | Point-to-Point Maximum EIRP *2 | Point-to-MultiPoint Intentional Radiator Power *1 | Point-to-MultiPoint Maximum EIRP *2 |
|---|---|---|---|---|---|---|---|
| UNII (Low) | 5.15-5.25 | 36, 40, 44, 48 | Indoor Only | 40mW 16dBm | 160mw 22dBm | 40mW 16dBm *4 | 160mW 22dBm |
| UNII-2 (Middle) | 5.25-5.35 | 52, 56, 60, 64 | Indoor or Outdoor | 200mW 23dBm | 800mW 29dBm | 200mW 23dBm *4 | 800mW 29dBm |
| UNII-2 Extended | 5.470-5.725 | 100, 104, 108, 112, 116, 120, 124, 128, 132, 136, 140 | Indoor or Outdoor | 200mW 23dBm | 800mW 29dBm | 200mW 23dBm *4 | 800mW 29dBm |
| UNII-3 (Upper) | 5.725-5.825 | 149 to 161 | Typical Outdoor | Antenna to 23dBi *3 | 200 watts | 800mW 29dBm *4 | 3200mW 35dBm |

FIG.3

| Test Environment | Indoor | Microcellular | Base coverage urban | High speed |
|---|---|---|---|---|
| Deployment scenario | Indoor Hotspot ('InH') | Urban Micro ('UMi') | Urban Macro ('UMa') | Rural Macro ('RMa') |
| Network layout | Indoor floor | Hexagonal grid | Hexagonal grid | Hexagonal grid |
| Site-to-site distance | 60 m | 200 m | 500 m | 1732 m |
| Carrier frequency | 3.4 GHz | 2.5 GHz | 2 GHz | 800 MHz |
| BS antenna height | 6 m, ceiling-mounted | 10 m, below rooftop | 25 m, above rooftop | 35 m, above rooftop |
| BS antenna gain | 0 dBi | 17 dBi | 17 dBi | 17 dBi |
| No of BS antennas | up to 8 | up to 8 | up to 8 | up to 8 |
| BS Tx power | 21 dBm/ 20 Mhz 24 dBm/ 40 Mhz | 41 dBm/ 10 Mhz 44 dBm/ 20 Mhz | 46 dBm/ 10 Mhz 49 dBm/ 20 Mhz | 46 dBm/ 10 Mhz 49 dBm/ 20 Mhz |
| No of UE antennas | up to 2 | up to 2 | up to 2 | up to 2 |
| UE antenna gain | 0 dBi | 0 dBi | 0 dBi | 0 dBi |
| UE Tx power | 21 dBm | 24 dBm | 24 dBm | 24 dBm |
| UE velocity | 3 km/h | 3 km/h | 30 km/h | 120 km/h |
| Inter-site interference modelling | Explicitly modelled | Explicitly modelled | Explicitly modelled | Explicitly modelled |

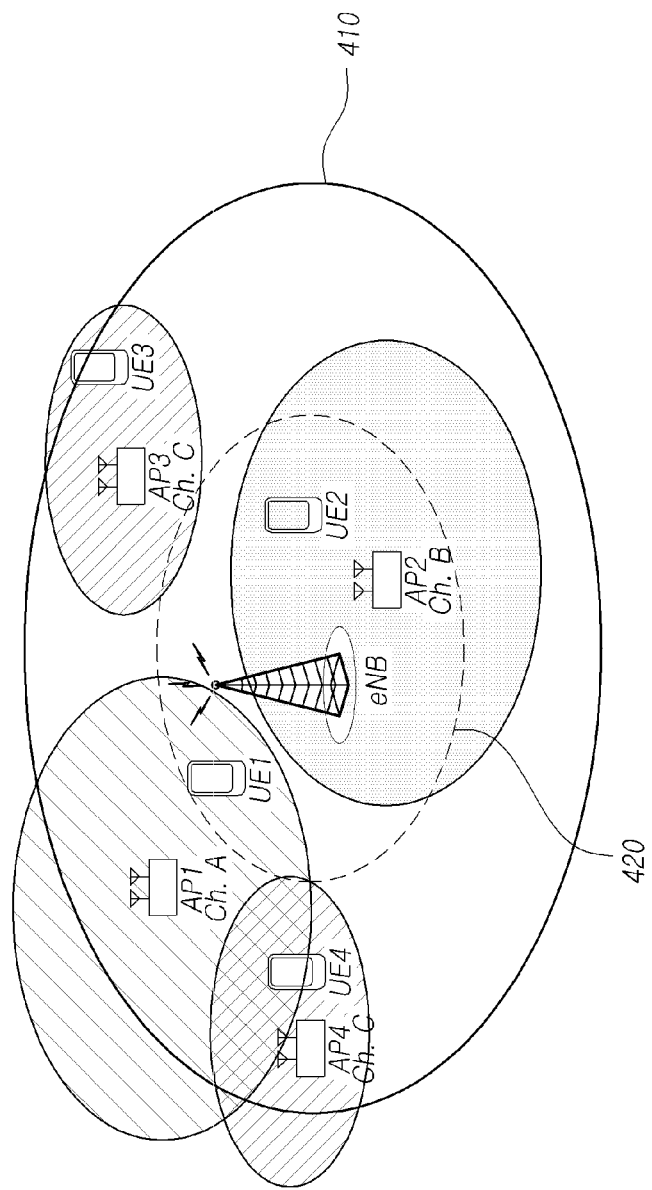

CARRIER AGGREGATION CONFIGURATION METHOD AND DEVICE FOR SAME

CROSS REFERENCE TO RELATED APPLICATIONS

This application is a National Stage Patent Application of PCT International Patent Application No. PCT/KR2015/008037 (filed on Jul. 31, 2015) under 35 U.S.C. § 371, which claims priority to Korean Patent Application Nos. 10-2014-0101467 (filed on Aug. 7, 2014), and 10-2015-0094846 (filed on Jul. 2, 2015), the teachings of which are incorporated herein in their entireties by reference.

TECHNICAL FIELD

The present disclosure relates to a method and apparatus for configuring carrier aggregation (CA). Particularly, the present disclosure relates to a method and apparatus for selecting a channel of an unlicensed spectrum when CA is configured for a user equipment (UE) using an unlicensed band cell that uses an unlicensed frequency band.

BACKGROUND ART

Due to advances in communication systems, various types of wireless terminals have been introduced to consumers, such as companies and individuals. A current mobile communication system has affiliated with $3^{rd}$ generation partnership project (3GPP), for example, Long Term Evolution (LTE), LTE-Advanced (LTE-A), and the like. Such a current mobile communication system has been required to transmit and receive a large amount of data at a high speed through a wireless communication network, as fast as transmission in a wired communication network. Accordingly, there is a demand to develop technology for wirelessly transmitting a large amount of data at a high speed as fast as transmission in a wired communication network. To this end, data transmission technology using a plurality of cells or small cells has been introduced. For example, the carrier aggregation technology is a technology that aggregates one or more component carriers and performs the transmission/reception of data to improve a data transmission/reception rate. A large amount of data may be processed at a high speed since an available frequency is increased from the perspective of a terminal.

However, there are drawbacks. For example, resources such as frequency for a mobile communication network are limited, and the number of mobile communication subscribers is abruptly increasing. Accordingly, there is limitation in improving a transmission/reception rate.

Further, respective frequency bands are used by different wireless communication systems based on a policy. Accordingly, mutual compatibility is low.

DETAILED DESCRIPTION OF THE INVENTION

Technical Problem

Therefore, the present disclosure has been made in view of the above-mentioned problems, and an aspect of the present disclosure is to provide a method and apparatus for configuring carrier aggregation (CA) for a user equipment (UE) using an unlicensed frequency band.

Another aspect of the present disclosure is to provide a detailed method and apparatus for minimizing interference and additionally configuring an unlicensed band cell for a UE.

Technical Solution

In accordance with an aspect of the present disclosure, there is provided a method for a user equipment (UE) to perform carrier aggregation (CA). The method may include: receiving channel candidate information of a secondary cell that uses an unlicensed frequency band from a base station; transmitting channel state information associated with one or more channels, which are generated using the channel candidate information; and adding, as the secondary cell, a channel that the base station selects based on the channel state information.

In accordance with another aspect of the present disclosure, there is provided a method for an base station to configure CA. The method may include: transmitting, to a user equipment (UE), channel candidate information of a secondary cell that uses an unlicensed frequency band; receiving channel state information associated with one or more channels, which are generated based on the channel candidate information; and additionally configuring a channel having the smallest signal interference as a secondary cell of the UE, based on the channel state information.

In accordance with another aspect of the present disclosure, there is provided a UE that performs carrier aggregation. The UE may include a receiving unit, a transmitting unit, and a controller. The receiving unit may be configured to receive, from an base station, channel candidate information of a secondary cell that uses an unlicensed frequency band. The transmitting unit may be configured to transmit channel state information associated with one or more channels, which are generated using the channel candidate information. The controller may be configured to add, as the secondary cell, a channel that the base station selects based on the channel state information.

In accordance with another aspect of the present disclosure, there is provided an base station that configures CA. The base station may include a transmitting unit, a receiving unit, and a controller. The transmitting unit may be configured to transmit, to a UE, channel candidate information of a secondary cell that uses an unlicensed frequency band. The receiving unit may be configured to receive channel state information associated with one or more channels, which are generated using the channel candidate information. The controller may be configured to add, as a secondary cell of the UE, a channel having the smallest signal interference based on the channel state information.

Advantageous Effects

According to embodiments of the present disclosure, carrier aggregation is configured for a user equipment (UE) by using an unlicensed band cell. Thus, a large amount of data is processed at a high speed.

Also, according to embodiments of the present disclosure, a channel having the smallest interference may be selected as a channel of an unlicensed band cell additionally configured for the UE. Accordingly, data transmission/reception efficiency and the resource efficiency of an entire system may be improved.

BRIEF DESCRIPTION OF THE DRAWINGS

FIG. 1 is a diagram illustrating a standard associated with a place where it is used and transmission power associated with an unlicensed national information infrastructure (UNII);

FIG. 3 is a diagram illustrating an example of an IMT-Advanced channel model;

FIG. 4 is a diagram illustrating each channel of an unlicensed frequency band and coverage of a primary cell and a secondary cell, for describing a carrier aggregation operation of the present disclosure;

MODE FOR CARRYING OUT THE INVENTION

Figure 2:
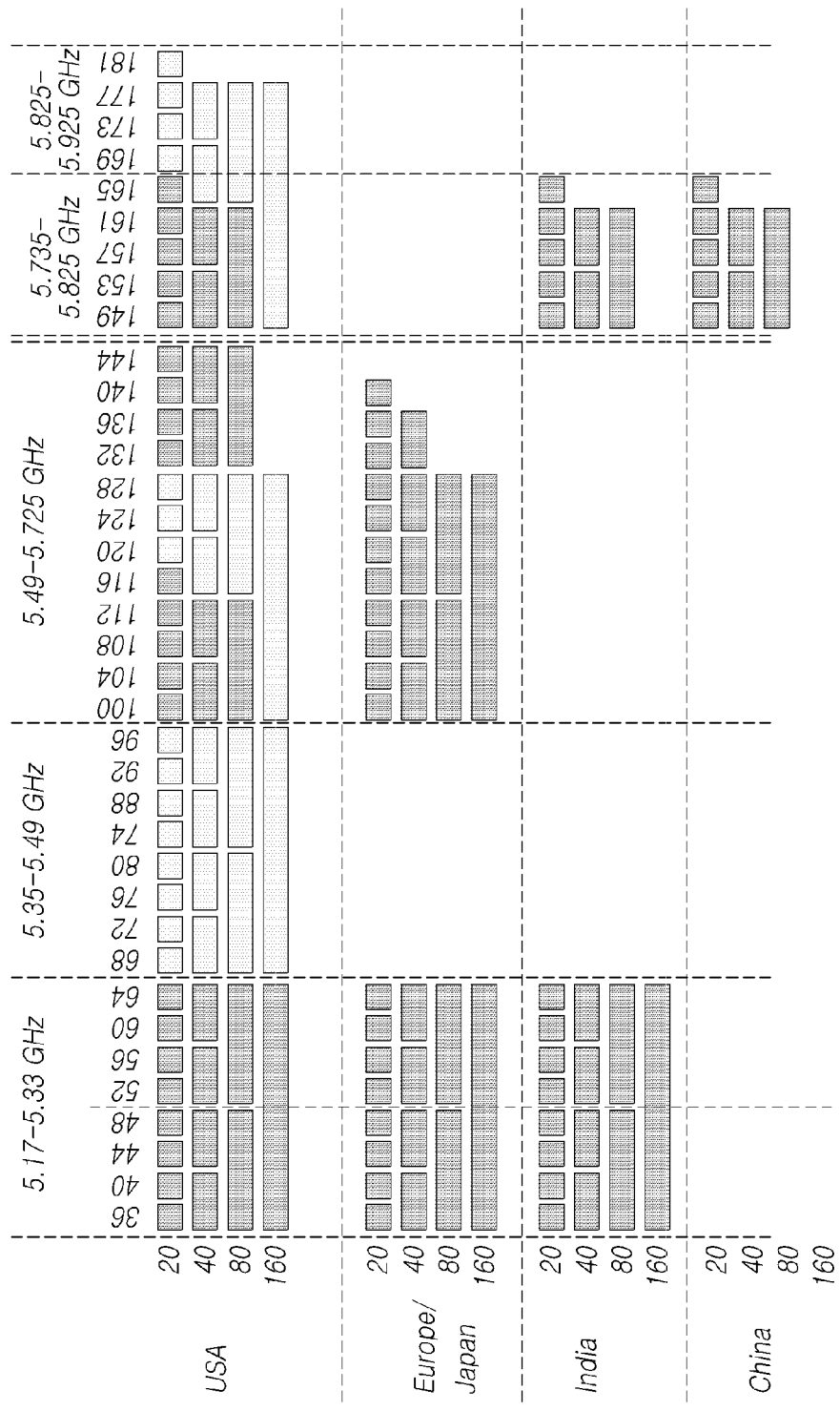
FIG. 2 is a diagram illustrating a WiFi channel that is used for each nation (or region) in an unlicensed spectrum of 5 GHz, with respect to bandwidths 20 Mhz, 40 MHz, 80 MHz, and 160 MHz based on IEEE 802, 11 ac standard.

Hereinafter, embodiments of the present disclosure will be described with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

A wireless communication system in the present disclosure may be widely installed to provide various communication services, such as a voice service, packet data, and the like. The wireless communication system may include a user equipment (UE) and a base station (BS) (or an eNB). Throughout the specifications, the UE may be an inclusive concept indicating a terminal utilized in wireless communication, and it should be construed as a concept including a user equipment (UE) in wideband code division multiple access (WCDMA), LTE, high speed packet access (HSPA), and the like, and a mobile station (MS), a user terminal (UT), a subscriber station (SS), a wireless device, and the like in global systems for mobile communication (GSM).

A BS or a cell may generally refer to a station performing communication with a UE. The BS or cell may also be referred to as a Node-B, an evolved Node-B (eNB), a sector, a site, a base transceiver system (BTS), an access point, a relay node, a remote radio head (RRH), a radio unit (RU), a small cell, and the like.

That is, the BS or the cell may be construed as an inclusive concept indicating a portion of an area or a function covered by a base station controller (BSC) in CDMA, a NodeB in WCDMA, an eNB or a sector (site) in LTE, and the like, and the concept may include various coverage areas, such as a communication range of a megacell, a macrocell, a microcell, a picocell, a femtocell, a relay node, an RRH, an RU, and a small cell, and the like.

Each of the above mentioned various cells has a BS that controls a corresponding cell, and thus, the BS may be construed in two ways. i) The BS may be a device itself that provides a mega cell, a macro cell, a micro cell, a picocell, a femtocell, and a small cell in association with a wireless area, or ii) the BS may indicate a wireless area itself. In i), all devices that interact with one another so as to enable the devices that provide a predetermined wireless area to be controlled by an identical entity or to cooperatively configure a wireless area, may be indicated as a BS. Based on a configuration type of a wireless area, an eNB, an RRH, an antenna, an RU, an LPN, a point, a transmission/reception point, a transmission point, a reception point, and the like may be embodiments of a BS. In ii), a wireless area itself that receives or transmits a signal from a perspective of a UE or a neighboring BS, may be indicated as a BS.

Therefore, a megacell, a macrocell, a microcell, a picocell, a femtocell, a small cell, an RRH, an antenna, an RU, a low power node (LPN), a point, an eNB, a transmission/reception point, a transmission point, and a reception point are commonly referred to as a BS.

In the present specifications, the UE and the BS are used as two inclusive transceiving subjects to embody the technology and technical concepts described in the specifications. The UE and the BS may not be limited to a predetermined term or word. The UE and the BS are used as two (uplink and downlink) inclusive transceiving subjects to embody the technology and technical concepts described in the specifications. The UE and the BS may not be limited to a predetermined term or word. Here, uplink (UL) refers to a scheme for a UE to transmit and receive data to/from a BS, and downlink (DL) refers to a scheme for a BS to transmit and receive to/from a UE.

Multiple access schemes applied to the wireless communication system may not be restricted. The wireless communication system may utilize varied multiple access schemes, such as code division multiple access (CDMA), time division multiple access (TDMA), frequency division multiple access (FDMA), orthogonal frequency division multiple access (OFDMA), OFDM-FDMA, OFDM-TDMA, OFDM-CDMA, and the like. An embodiment of the present disclosure may be applicable to resource allocation in asynchronous wireless communication that is advanced through GSM, WCDMA, and HSPA, to be LTE and LTE-advanced, and may be applicable to resource allocation in synchronous wireless communication that is advanced through CDMA and CDMA-2000, to be UMB. The present disclosure may not be limited to a specific wireless communication field, and it should be construed that the present disclosure includes all technical fields to which the technical idea of the present disclosure is applicable.

Uplink transmission and downlink transmission may be performed based on a time division duplex (TDD) scheme that performs transmission based on different times, or based on a frequency division duplex (FDD) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a physical downlink control channel (PDCCH), a physical control format indicator channel (PCFICH), a physical hybrid ARQ indicator channel (PHICH), a physical uplink control channel (PUCCH), an enhanced physical downlink control channel (EPDCCH), and the like, and may transmit data by configuring a data channel, such as a Physical Downlink Shared Channel (PDSCH), a Physical Uplink Shared Channel (PUSCH), and the like.

Control information may be transmitted using an enhanced PDCCH or extended PDCCH (EPDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system according to embodiments refers to a coordinated multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and UEs.

A multi-transmission/reception point may be a BS or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a UE, and an uplink refers to communication or a communication path from a UE to a multi-transmission/reception point. In a downlink, a transmitter may be a part of a multiple transmission/reception points and a receiver may be a part of a UE. In an uplink, a transmitter may be a part of a UE, and a receiver may be a part of multiple transmission/reception points.

Hereinafter, the situation in which a signal is transmitted and received through a PUCCH, a PUSCH, a PDCCH, an EPDSCH, a PDSCH, and the like may be described through the expression, "a PUCCH, a PUSCH, a PDCCH, an EPDCCH, or a PDSCH is transmitted or received".

In addition, hereinafter, the expression "a PDCCH is transmitted or received or a signal is transmitted or received through a PDCCH" includes "an EPDCCH is transmitted or received or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which is an embodiment of the present disclosure, may be applied to the part described using a PDCCH, and to the part described using an EPDCCH.

Hereinafter, a high layer signaling includes an RRC signaling that transmits RRC information including an RRC parameter.

An eNB executes downlink transmission to terminals. The eNB may transmit a physical downlink shared channel (PDSCH), which is a main physical channel for unicast transmission, and the eNB may transmit a physical downlink control channel (PDCCH) for transmitting downlink control information, such as scheduling required for reception of a PDSCH, and scheduling grant information for transmission of an uplink data channel (for example, a physical uplink shared channel (PUSCH)). Hereinafter, transmission and reception of a signal through each channel will be described as the transmission and reception of a corresponding channel.

In a typical 3GPP LTE network, each communication service provider (e.g., communication carriers) is allocated with a designated licensed spectrum. Accordingly, interference occurs rarely at the same frequency spectrum in communication service provider a homogeneous networks or heterogeneous networks commonly operated by multiple service providers (e.g., communication service providers). However, available frequency resource is very limited in a licensed spectrum. Also, there are many demands for additional licensed spectrums in order to satisfy explosively increasing amount of data communication service provider.

An unlicensed spectrum is a frequency band that anyone can use at no charge unlike the licensed spectrum. The unlicensed spectrum is also referred to as an industrial, scientific, medical (ISM) band. ISM may also denote operation of equipment or a device that generates radio wave energy and uses the same in a limited place for industrial, scientific, medical, and household purpose, other than telecommunication. The ISM band may be designed for common use, which allows mutual interference. Therefore, a device for the ISM band is a low power device for minimize interference.

Frequency bands that are mainly used for the communication field among the ISM frequency band is 9 MHz, 2.4 GHz, and 5 GHz. For example, WiFi or wireless local area network (WLAN) devices mainly use 2.4 GHz band and 5 GHz band. Such bands are globally defined as the ISM band.

FIG. 1 is a table illustrating standards of unlicensed national information infrastructure (UNII).

Referring to FIG. 1, Federal Communications Commission (FCC) of the United State specifies a band of approximately 300 MHz in the above described 5 GHz as an unlicensed national information infrastructure (UNII), subdivides the band, and limits use location and transmission power as shown in FIG. 1. Therefore, WiFi devices used in the U.S. may comply with FIG. 1. Equivalent isotropically radiated power (EIRP) in FIG. 1 is equal to the sum of a transmission power and an antenna gain. That is, EIRP may be calculated based on Equation 1 provided below.

$$EIRP = Tx\text{Power} + \text{Antenna gain}$$

FIG. 2 is a diagram illustrating a WiFi channel used for each nation (or region) in the 5 GHz unlicensed band, with respect to bandwidths 20 Mhz, 40 MHz, 80 MHz, and 160 MHz based on IEEE 802, 11ac standard.

Under the situation, communication service providers may provide a service using an unlicensed spectrum. That is, instead of investing costs for securing an additional licensed spectrum, the communication service providers may save costs by using the unlicensed spectrum which is free. Also, when compared with WiFi, a radio resource in the unlicensed spectrum may be more efficiently controlled.

Hereinafter, a method of using an LTE network in the unlicensed spectrum is referred to an LTE-U or U-LTE (LTE on unlicensed spectrum).

The LTE-U technology in the present disclosure may be embodied by carrier aggregation (CA) that aggregates frequency resources located in the typical licensed spectrum and frequency resources located in the unlicensed spectrum. Particularly, a component carrier (CC) in the typical licensed spectrum is set to a primary serving cell (PCell), and a CC in the unlicensed spectrum may be set to a secondary serving cell (SCell). Therefore, whether to use a CC located in the unlicensed spectrum as an SCell and scheduling information associated with a transmission resource of the SCell may be transferred to a UE through the PCell that operates in the licensed spectrum. Also, the UE may feed back channel information collected from the unlicensed spectrum to the PCell in the licensed spectrum.

To use the LTE-U technology, it is necessary to overcome signal interference problem.

Particularly, to coexist with a heterogeneous network that uses the same unlicensed spectrum in the LTE-U technology or to coexist with another communication service provider that uses the LTE-UE technology, there is a desire for a method of effectively avoiding interference occurring between them. For example, a listen-before-talk (LBT) may be used as the method of avoiding the interference. The LBT is a method that determines in advance whether a desired frequency band is used by a heterogeneous network or another communication service provider at a predetermined time, and uses the same when it is determined that the corresponding band is not used.

In accordance with embodiments of the present disclosure, a method may be provided for an eNB to select a frequency band and a channel to be used as an SCell in the LTE-U technology.

FIG. 3 is a diagram exemplary illustrating an IMT-Advanced channel model.

By taking into consideration an output power and a center frequency of a frequency band of FIG. 1 and FIG. 2, coverage of a PCell and an SCell in the LTE-U technology may be expressed as shown in FIG. 4.

FIG. 4 is a diagram illustrating each channel of an unlicensed frequency band and coverage of a primary cell and a secondary cell, for describing a carrier aggregation operation in accordance with embodiments of the present disclosure.

Referring to FIG. 4, an SCell in an unlicensed spectrum uses a relatively low output power and uses a relatively high frequency band. Therefore, when compared with a coverage 410 of a PCell that uses a licensed spectrum, an SCell that uses an unlicensed spectrum may have a relatively small coverage 420. In FIG. 4, a black solid line around an eNB indicates the coverage 410 of the PCell, and a broken line indicates the coverage 420 of the SCell.

In accordance with at least one embodiment of the present disclosure, the SCell is used as only a downlink CC. When the SCell of the LTE-U is used as only a downlink CC, the eNB may not be capable of receiving an unlicensed band signal, and the eNB may be capable of performing only a downlink transmission in the unlicensed spectrum. Therefore, it has an LBT structure in which the UE listens to ('Listen') the unlicensed spectrum and the eNB talks to ('Talk') the unlicensed spectrum.

In this instance, to determine a channel of the unlicensed spectrum to be used as an SCell, the eNB may need to be fed back, by the UE, information indicating whether the unlicensed spectrum is used.

However, as shown in FIG. 2, there are a large number of channels exists in the unlicensed spectrum. Therefore, it is inefficient that the UE feeds back information indicating whether a channel is used with respect to all of the channels in the unlicensed spectrum. Also, the number of available channels is set to be different for each nation, and an available channel may be defined in advance under the mutual agreement between communication service providers that desire to use LTE-U.

Therefore, to solve the above described drawback, the present disclosure provides a method and a detailed procedure for an eNB to select a channel to be additionally configured as an SCell based on unlicensed band channel information received from a UE.

Figure 5:
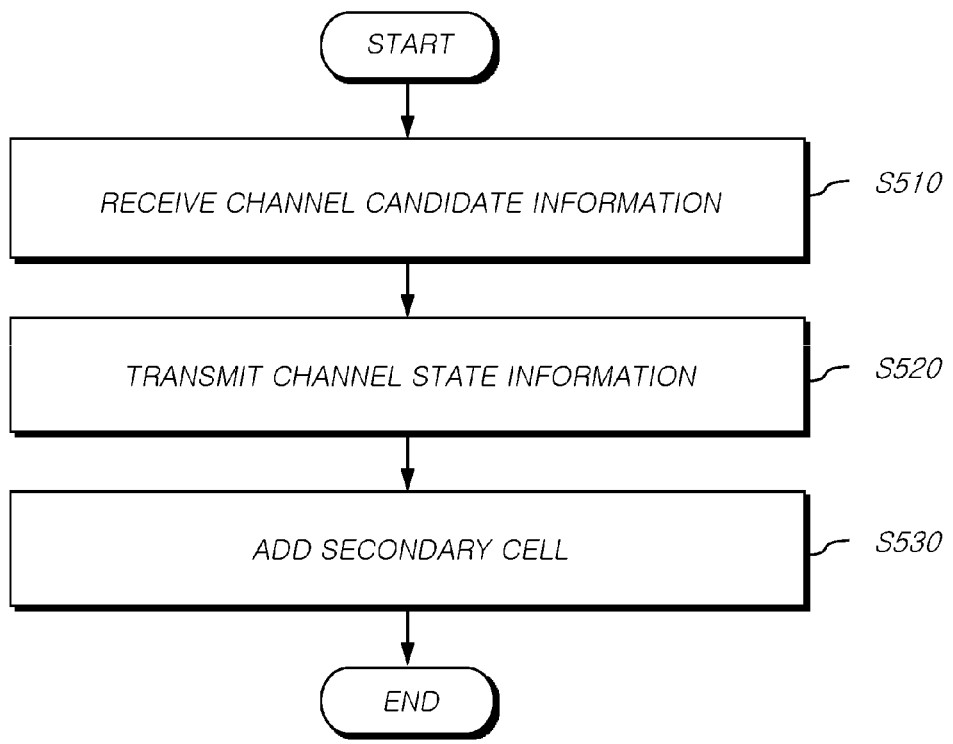
FIG. 5 is a diagram illustrating operations of a user equipment (UE) according to an embodiment of the present disclosure.

FIG. 5 is a diagram illustrating operations of a UE according to an embodiment of the present disclosure.

In accordance with at least one embodiment, a UE may perform an operation of receiving, from an eNB, channel candidate information of a secondary cell that uses an unlicensed frequency band, an operation of transmitting channel state information associated with one or more channels, which are generated based on the channel candidate information, and an operation of adding, as the secondary cell, a channel that the eNB selects based on the channel state information.

Referring to FIG. 5, the UE receives, from the eNB, channel candidate information of a secondary cell that uses an unlicensed frequency band in operation S510. For example, the UE may receive, from the eNB, candidate information associated with a channel in the unlicensed spectrum which may be added as a secondary cell. In the present specifications, an unlicensed spectrum and an unlicensed frequency band are described as interchangeably used as occasion arises. However, embodiments of the present disclosure are not limited thereto.

Particularly, the eNB may provide channel candidate information to the UE through a high layer signaling of a PCell. For example, the channel candidate information may include one or more pieces of information out of unlicensed frequency band information associated with each of one or more unlicensed band channels, information associated with the number of channel candidates, and channel candidate list information. That is, the channel candidate information may include a 20 MHz bandwidth unit channel information, which is a previously agreed bandwidth to be used as an SCell CC. Also, the channel candidate information may be formed of a plurality of channels and include the number of channels and a channel list.

The UE transmits channel state information associated with one or more channels, which are generated based on the channel candidate information, in operation S520. For example, the UE may receive the channel candidate information and measure a channel state of each channel based on corresponding channel candidate information. The UE may transmit, to the eNB, the measured channel state information associated with each channel.

Particularly, the UE may determine whether a frequency resource of a corresponding channel is already used or not with respect to each candidate channel included in the channel candidate information. The UE may feedback the same to the eNB through the uplink of the PCell. For example, the UE may determine whether each candidate channel is used by another communication system or another communication service provider. The UE may transmit the same to the eNB by including the same in the channel state information. Whether a channel in the unlicensed spectrum is used may be determined through detecting the energy of a corresponding channel, detecting a signal strength, and the like. Also, the channel state information transmitted by the UE may include signal strength information associated with each candidate channel. That is, the UE may feed back the signal strength (e.g., a received signal strength indicator (RSSI)) of a received signal that is measured with respect to a frequency resource of each candidate channel, to the eNB through the uplink of the PCell.

The UE adds, as the secondary cell, a channel that the eNB selects based on the channel state information in operation S530. For example, the UE may perform carrier aggregation by additionally configuring, as a secondary cell, the channel selected based on the selection made by the eNB. Here, the eNB may select a channel in the unlicensed spectrum, which is to be additionally configured as a secondary cell for the UE, by using the channel state information transmitted from the UE.

For example, when the ratio of channels that are not used in the unlicensed spectrum is high, the eNB may select, as a CC of the SCell, one of the channels that are not currently used based on only the channel state information.

As another example, the eNB may compare the received signal's signal strength information of each candidate channel included in the channel state information. The eNB may select a channel having the lowest signal strength as a CC of the SCell.

As another example, as illustrated in FIG. 4, a large number of UEs may be located in the coverage of an eNB, and each UE may transmit channel state information associated with the same unlicensed band channel. Therefore, the eNB may receive signal strengths of unlicensed band channels from a plurality of UEs. In this instance, the eNB compares the signal strengths transmitted by the plurality of UEs and detects the maximum signal strength for each channel, compares the maximum signal strengths of the channels, and selects a channel having the lowest maximum signal strength as a CC of the SCell.

In addition, the eNB may select an SCell to be additionally configured for the UE based on a predetermined threshold value or a predetermined rule by using the channel state information received from the UE, and through the above, the UE may additionally configure an unlicensed band cell having the corresponding channel as the SCell, and the UE may perform the transmission/reception of data.

Figure 6:
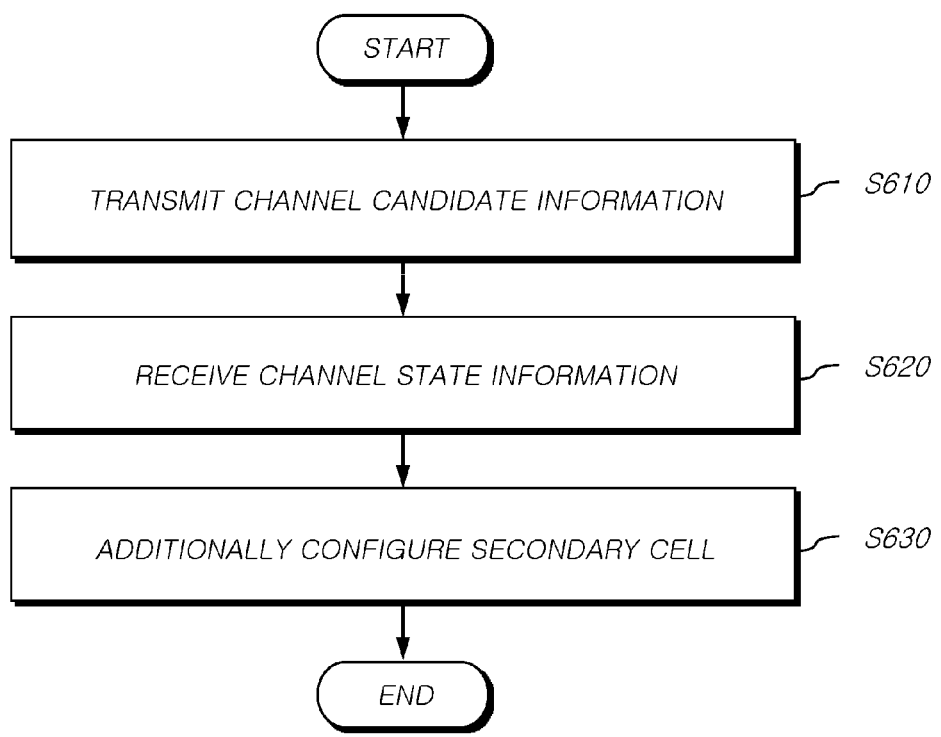
FIG. 6 is a diagram illustrating operations of an evolved Node B (eNB) according to another embodiment of the present disclosure.

FIG. 6 is a diagram illustrating operations of an eNB according to at least one embodiment of the present disclosure.

A method for an eNB, according to an least one embodiment of the present disclosure, to configure carrier aggregation may include: an operation of transmitting, to a UE, channel candidate information of a secondary cell that uses an unlicensed frequency band; an operation of receiving channel state information associated with one or more channels, which are generated based on the channel candidate information; and additionally configuring a channel having the lowest signal interference as the secondary cell of the UE, based on the channel state information.

Referring to FIG. 6, the eNB transmits, to the UE, channel candidate information of a secondary cell that uses an unlicensed frequency band in operation S610. The eNB transmits, to the UE, the channel candidate information including information associated with a channel of the unlicensed band cell that uses the unlicensed spectrum. For example, the eNB may transmit the channel candidate information to the UE using a high layer signaling of the PCell that uses a licensed spectrum.

As described above, the channel candidate information may include one or more pieces of information out of unlicensed frequency band information associated with each of one or more unlicensed band channels, information associated with the number of channel candidates, and channel candidate list information. That is, the channel candidate information may include 20 MHz bandwidth unit channel information, which is a previously agreed bandwidth to be used as an SCell CC. Also, the channel candidate information may be formed of a plurality of channels and include the number of channels and a channel list.

Also, the eNB receives channel state information associated with one or more channels, which are generated based on the channel candidate information, in operation S620. The eNB may receive the channel state information associated with each channel that the UE measures based on the channel candidate information. The channel state information may be received through a licensed band PCell. Particularly, the channel state information may include information associated with whether a frequency resource of each channel is used or information associated with a signal strength of each channel, with respect to each candidate channel included in the channel candidate information. For example, the information associated with whether each channel is used may include information associated with whether the energy of a corresponding channel or the strength of a received signal exceeds a predetermined threshold value. Alternatively, information associated with whether each channel is used may be each channel's energy detection value or a strength value of a received signal itself. Also, the channel state information may include signal strength information associated with each candidate channel. That is, the UE measures the signal strength (e.g., a received signal strength indicator (RSSI)) of a received signal with respect to a frequency resource of each candidate channel, and the eNB may receive the channel state information including the result value thereof, from the UE through the PCell.

Also, the eNB additionally configures a channel having the lowest signal interference as the secondary cell of the UE, based on the channel state information, in operation S630. As described above, for configuring carrier aggregation for the UE, the eNB may select an unlicensed band channel to be added as an SCell, based on the received channel state information. The eNB selects a channel having the best efficiency from among channel candidates and configures an SCell for the UE, thereby improving a system throughput and reliably processing high-speed and high-capacity data with the UE. To this end, the eNB may select a channel of the SCell to be added to the UE by using a predetermined rule or a predetermined threshold value based on the received channel state information.

For example, when the ratio of channels that are not used in the unlicensed spectrum is high, the eNB may select, as a CC of the SCell, one of the channels that are not currently used based on only the channel state information.

As another example, the eNB may compare the received signal's signal strength information of each candidate channel included in the channel state information, and the eNB may select a channel having the lowest signal strength as a CC of the SCell.

As another example, as illustrated in FIG. 4, a large number of UEs may be located in the coverage of an eNB, and each UE may transmit channel state information associated with the same unlicensed band channel. Therefore, the eNB may receive signal strengths of unlicensed band channels from a plurality of UEs. In this instance, the eNB compares the signal strengths transmitted by the plurality of UEs and detects the maximum signal strength for each channel, compares the maximum signal strengths of the channels, and selects a channel having the lowest maximum signal strength as a CC of the SCell.

As described above, communication with a UE may be performed through an unlicensed spectrum by applying the above described embodiments of the present disclosure, which improves efficiency from the perspective of costs. Also, the above described embodiments of the present disclosure use an unlicensed band frequency that anyone can use, by minimizing signal interference. Thus, the above described embodiments may provide efficiency in using frequencies and resources. Particularly, the eNB provides information associated with a candidate channel of an SCell when carrier aggregation is performed for the UE. Thus, the UE may prevent an unnecessary operation of providing channel state information associated with all of the channels in the unlicensed spectrum to the eNB.

As described with reference to FIG. 4, the unlicensed spectrum may have a relatively narrow coverage compared with that of the licensed spectrum. Therefore, all of the UEs located in the licensed band coverage of the eNB may not need to feed back channel state information associated with all of the candidate channels in the unlicensed frequency band that the eNB may provide as an SCell.

Referring back to FIG. 4, the eNB may be fed back information associated with a channel candidate from all of the UEs in the coverage 410 of the PCell. However, the coverage 420 of the SCell that uses the unlicensed spectrum is formed to be smaller than the coverage 410 of the PCell. Thus, it is inefficient to determine a channel to be used as a CC of the SCell by using the feedback from all of the UEs.

For example, in FIG. 4, although UE 3 and UE 4 are located outside the coverage 420 of the SCell, UE 3 and UE 4 are located in the coverage of WiFi AP 3 and AP 4, respectively. Therefore, according to an embodiment of the present disclosure, when WiFi AP 3 and AP 4 that currently use Ch. C transmit signals using the corresponding channel, UE 3 and UE 4 may feed back information indicating that Ch. C is currently used, or may feed back information indicating that the strength of a received signal of Ch. C is high.

However, the coverage of the SCell and the coverage of AP 3 and AP 4 do not overlap, and thus, the probability of generating mutual interference may be low although the eNB selects Ch. C as the channel of the SCell. Therefore, in the case of Ch. C, although the probability of generating signal interference is low, the eNB may depend on only channel state information and may not use Ch. C as the CC of the SCell.

To overcome such a drawback, the eNB according to another embodiment of the present disclosure may select a channel based on the location of a UE that transmits the channel state information and the coverage of an unlicensed band cell to be used as the SCell.

Figure 7:
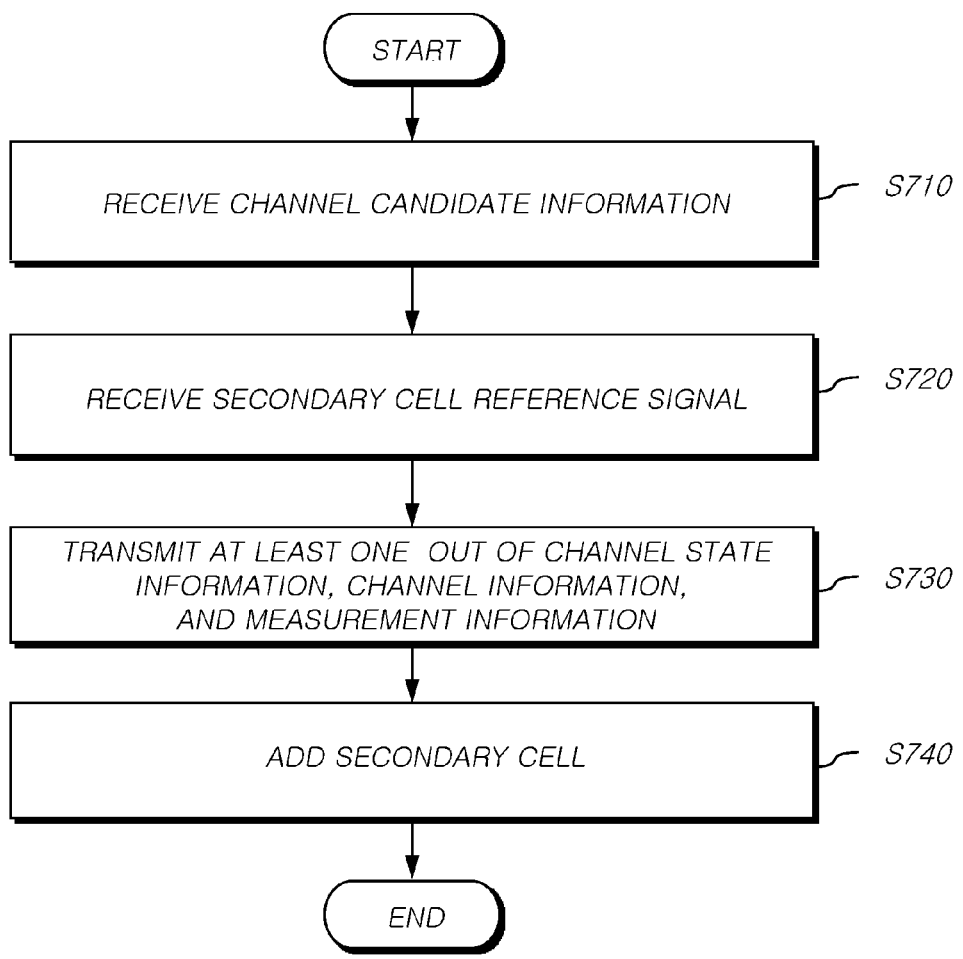
FIG. 7 is a diagram illustrating operations of a UE according to another embodiment of the present disclosure.

FIG. 7 is a diagram illustrating operations of a UE according to another embodiment of the present disclosure.

A UE according to another embodiment of the present disclosure may further perform an operation of transmitting channel information of a primary cell and reference signal measurement information associated with a secondary cell. In this instance, an eNB may select a channel of the secondary cell by further using the location information of the UE, which is calculated based on the channel information of the primary cell or the reference signal measurement information associated with the secondary cell. Alternatively, the UE may further perform an operation of receiving the reference signal of the secondary cell from the eNB. In this instance, the reference signal of the secondary cell may be a cell specific reference signal that is transmitted in a channel of an unlicensed frequency band by using physical cell identification information that is the same as that of the primary cell.

For example, the eNB may determine whether the UE is located at a coverage edge of the PCell or whether the UE is located outside the expected coverage of the SCell by using the strength of a received signal associated with an uplink channel transmitted by the UE of the PCell or channel information (channel state information (CSI)) of the PCell transmitted by the UE. Hereinafter, although the CSI of the PCell is described as channel information of the PCell to distinguish the same from the described channel state information associated with a channel of the unlicensed spectrum, the embodiments of the present disclosure are not limited thereto.

Alternatively, the eNB transmits, to the UE, a reference signal using a channel of the unlicensed spectrum, and the UE transmits, to the eNB, reference signal measurement information associated with a secondary cell which is obtained by measuring the corresponding reference signal. Through the above, the eNB may determine the relative location of the UE in the coverage of a corresponding unlicensed band channel.

Referring to FIG. 7, the UE receives, from the eNB, channel candidate information of a secondary cell that uses an unlicensed frequency band in operation S710. For example, the UE may receive, from the eNB, candidate information associated with a channel in the unlicensed spectrum that may be added as a secondary cell. Particularly, the UE may receive the channel candidate information using a high layer signaling of a PCell. Also, the channel candidate information may include one or more pieces of information out of unlicensed frequency band information associated with each of one or more unlicensed band channels, information associated with the number of channel candidates, and channel candidate list information.

When the UE receives the reference signal of the secondary cell, the channel candidate information may further include at least one piece of information associated with a transmission power of the secondary cell reference signal, transmission location information, and transmission period information.

Subsequently, the UE receives a reference signal of the secondary cell from the eNB in operation S720. For example, the eNB may generate a PSS/SSS and a cell specific reference signal (CRS) associated with an antenna port 0 by using physical cell identification information (PCI) that is the same as that of the PCell with respect to all of the channel candidates. The eNB transmits, to a candidate channel, the same as the reference signal of the secondary cell. Antenna port 0 may be transmitted in only some predetermined RBs out of 100 RBs in the whole 20 MHz bandwidth.

Operation 720 may be performed only when the UE transmits, to the eNB, measurement information obtained by measuring the reference signal of the secondary cell. Therefore, when the UE transmits an uplink signal of the PCell or a CSI of the PCell to the eNB, as described above, operation S720 may be omitted.

Subsequently, the UE transmits, to the eNB, at least one of channel state information of an unlicensed band channel candidate, channel information of the PCell, and reference signal measurement information associated with the secondary cell in operation S730.

For example, as described with reference to FIG. 5, the UE may transmit, to the eNB, channel state information associated with an unlicensed band channel candidate. As occasion arises, the UE may transmit, to the eNB, the channel information of the PCell or the reference signal measurement information associated with the secondary cell, which may be used for estimating the relative location of the UE.

Particularly, the UE may measure a channel associated with a channel candidate, such as reference signal received power (RSRP), by using the reference signal of the secondary cell that the eNB transmits through a channel candidate, and transmits measurement information to the eNB. When the eNB uses the corresponding channel candidate as a CC of the SCell based on the measurement information, the eNB may determine in advance whether the UE exists in the expected coverage of the corresponding SCell.

Also, the eNB may separately transmit, to the eNB, the reference signal measurement information associated with the secondary cell and channel state information measured by using a transmission resource of a channel in which a reference signal and a PSS/SSS are not transmitted. Alternatively, the UE may generate a single piece of feedback information, such as an SINR or a reference signal received quality (RSRQ), by using two pieces of feedback information, that is, the measurement information and channel state information, and may transmit the same to the eNB.

When operation S720 is omitted, the UE may transmit the CSI of the PCell to the eNB. Through the above, the eNB may determine the relative location of the UE.

Alternatively, when operation S720 is omitted, the UE transmits an uplink signal to the eNB, and the eNB may determine the location of the UE based on the reception strength of the uplink signal of the UE.

The UE adds, as the secondary cell, a channel that the eNB selects based on the channel state information in operation S740. For example, the UE may perform carrier aggregation by additionally configuring, as the secondary cell, the channel selected based on the selection made by the eNB. Here, the eNB may select the channel of the SCell to be additionally configured for the UE, by further using the information received in operation S730, together with the operation that has been described with reference to FIG. 5.

As described above, the UE transmits information from which the location of the UE is determined, to the eNB in various methods. Thus, a problem that may be caused by a difference between the location of the UE and the coverage of the SCell may be overcome.

Hereinafter, operations of an eNB will be described with reference to FIG. 8, in association with a method of selecting a channel based on the location of a UE.

Figure 8:
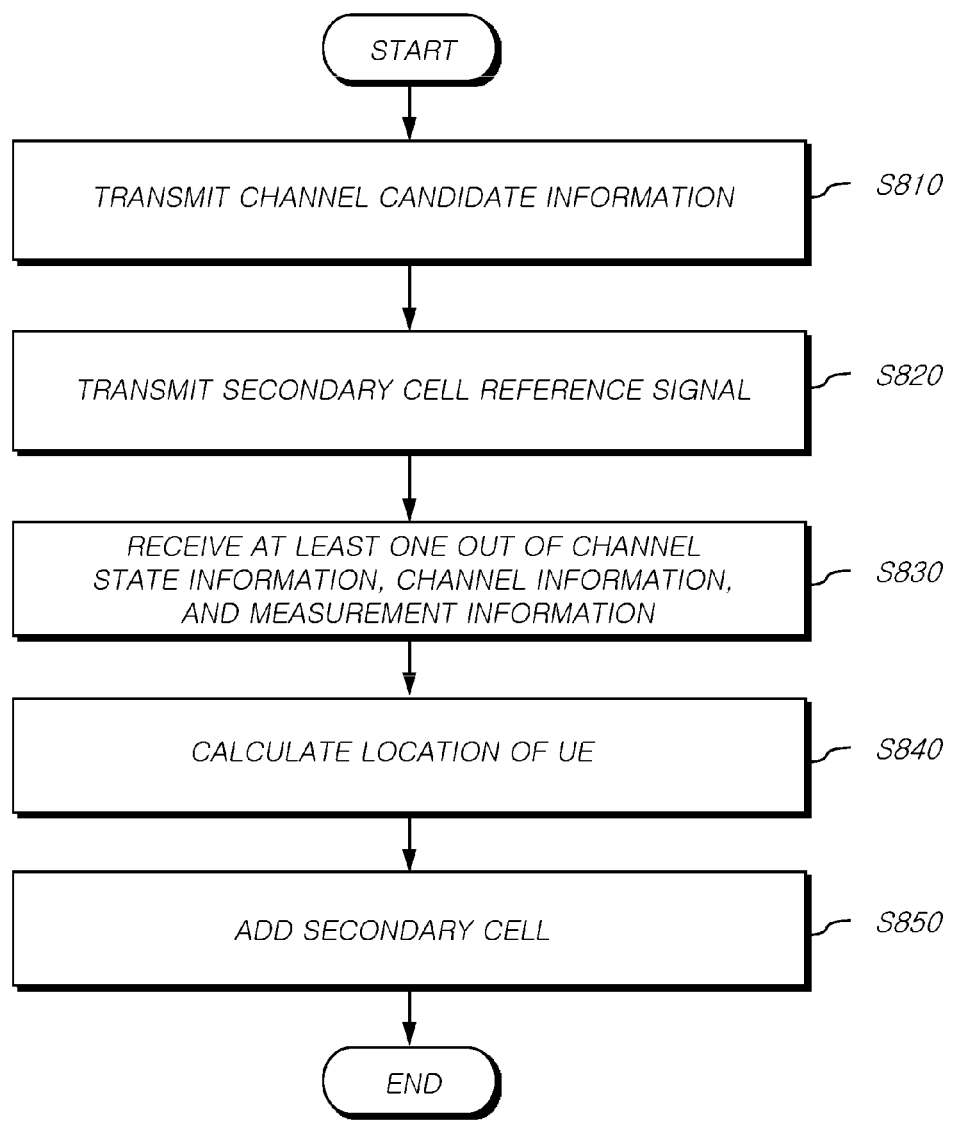
FIG. 8 is a diagram illustrating operations of an eNB according to another embodiment of the present disclosure.

FIG. 8 is a diagram illustrating operations of an eNB according to another embodiment of the present disclosure.

An eNB according to another embodiment of the present disclosure may further perform an operation of receiving channel information of a primary cell or a reference signal measurement information associated with a secondary cell; and an operation of calculating location information of the UE based on the channel information of the primary cell or the reference signal measurement information associated with the secondary cell. A channel that is additionally configured as the secondary cell may be selected based on channel state information and the location information of the UE.

Also, the eNB may further perform an operation of transmitting the reference signal of the secondary cell to the UE. The reference signal of the secondary cell may be a cell specific reference signal that is transmitted in a channel of an unlicensed frequency band by using physical cell identification information that is the same as that of the primary cell.

Referring to FIG. 8, the eNB transmits, to the UE, channel candidate information of a secondary cell that uses the unlicensed frequency band in operation S810. The eNB transmits, to the UE, the channel candidate information including information associated with a channel of an unlicensed band cell that uses an unlicensed spectrum. The channel candidate information may include one or more pieces of information out of unlicensed frequency band information associated with each of one or more unlicensed band channels, information associated with the number of channel candidates, and channel candidate list information. When the eNB transmits the reference signal of the secondary cell, the channel candidate information may further include at least one piece of information associated with a transmission power of the secondary cell reference signal, transmission location information, and transmission period information.

As occasion arises, the eNB further transmits, to the UE, the reference signal of the secondary cell in operation S820. For example, the eNB may generate a PSS/SSS and a cell specific reference signal (CRS) associated with an antenna port 0 by using physical cell identification information (PCI) that is the same as that of the PCell with respect to all of the channel candidates. The eNB transmits, to a candidate channel, the same as the reference signal of the secondary cell. Antenna port 0 may be transmitted in only some predetermined RBs out of 100 RBs in the whole 20 MHz bandwidth. Operation 820 may be performed only when the UE transmits, to the eNB, measurement information obtained by measuring the reference signal of the secondary cell. Therefore, when the UE transmits an uplink signal of the PCell or a CSI of the PCell to the eNB, as described above, operation S820 may be omitted. In this instance, the transmission power of the reference signal may use the maximum transmission power that is available in the unlicensed spectrum, or may use a transmission power that the eNB and the UE agree upon in advance. Alternatively, as described above, the transmission power information of the reference signal may be included in the channel candidate information. Also, the location where a reference signal is transmitted in the time domain or information associated with a transmission period may be included in the channel candidate information.

Also, the eNB receives at least one of channel state information of an unlicensed band channel, channel information of the PCell, and reference signal measurement information associated with the secondary cell in operation S830. For example, as described with reference to FIG. 5, the eNB may receive channel state information associated with an unlicensed band channel candidate. As occasion arises, the eNB may receive the channel information of the PCell or the reference signal measurement information associated with the secondary cell, which may be used for estimating the relative location of the UE.

Particularly, the eNB may receive measurement information associated with a channel candidate, such as reference signal received power (RSRP), which the UE measures by using the reference signal of the secondary cell transmitted through a channel candidate.

Also, the eNB may separately receive the reference signal measurement information associated with the secondary cell and channel state information that the UE measures using a transmission resource of a channel in which a reference signal and a PSS/SSS are not transmitted. Alternatively, the eNB may receive a single piece of feedback information, such as, an SINR or a reference signal received quality (RSRQ), which is generated using two pieces of feedback information, that is, the measurement information and channel state information.

When operation S820 is omitted, the eNB may receive the CSI of the PCell. Alternatively, when operation S820 is omitted, the eNB may receive an uplink signal that the UE transmits and determine the location of the UE based on the reception strength of the uplink signal of the UE.

In operation S840, the eNB determines the relative location of the UE based on the information received in operation S830. For example, the eNB may determine whether the UE is located in the coverage of an unlicensed band channel based on the reference signal measurement information associated with the secondary cell that the UE transmits.

That is, when the eNB uses a corresponding channel candidate as a CC of the SCell based on the measurement information, the eNB may determine in advance whether the UE exists in the expected coverage of the corresponding SCell.

Alternatively, the eNB may determine the approximate location where the UE is located in the coverage of the PCell based on the channel information of the PCell that the UE transmits. The eNB may determine whether the UE is located in the coverage that is configured as the SCell.

Alternatively, the eNB may determine the relative location of the UE by determining the reception strength of a signal that the UE transmits through the uplink of the PCell.

The eNB additionally configures a channel having the lowest signal interference as the secondary cell of the UE based on the channel state information and the location information of the UE in operation S850. In this instance, to overcome the above described problem, the eNB may select a channel to be additionally configured as the secondary cell by disregarding the channel state information that is transmitted by a UE that is located outside the coverage of the SCell. That is, the eNB selects UEs that exist in the expected coverage of the SCell and select a channel that is to be configured as an SCell of a UE by using channel state information received from the UEs.

As described above, according to another embodiment of the present disclosure, unnecessary channel state information may be filtered, and thus, a channel is more accurately selected.

Hereinafter, configurations of a UE and an eNB according to embodiments of the present disclosure will be described again with reference to drawings.

Figure 9:
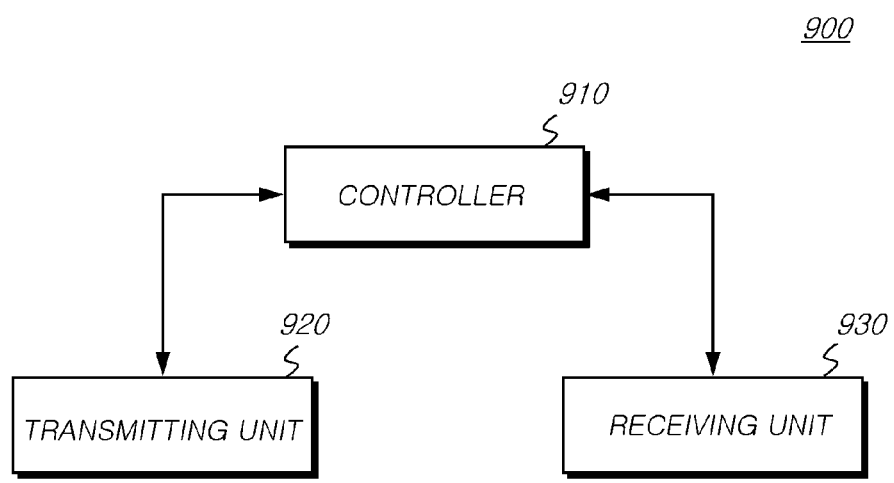
FIG. 9 is a block diagram illustrating a configuration of a UE according to another embodiment of the present disclosure.

FIG. 9 is a block diagram illustrating a configuration of a UE according to at least one embodiment of the present disclosure.

Referring to FIG. 9, a UE 900 according to at least one embodiment of the present disclosure may include: a receiving unit 930 configured to receive channel candidate information of a secondary cell that uses an unlicensed frequency band from an eNB; a transmitting unit 920 configured to transmit channel state information associated with one or more channels, which are generated based on the channel candidate information; and a controller 910 configured to add, as a secondary cell, a channel that the eNB selects based on the channel state information.

Also, the transmitting unit 920 may further transmit channel information of a primary cell or reference signal measurement information associated with a secondary cell, as occasion arises. The transmitting unit 920 transmits, to the eNB, uplink control information, data, and a message, through a corresponding channel. The channel state information may include information associated with whether each of one or more channels is used or information associated with a signal strength.

The receiving unit 930 may further receive a reference signal of the secondary cell, from the eNB. The receiving unit 930 may receive, from the eNB, downlink control information, data, and a message, through a corresponding channel. The channel candidate information may include at least one of unlicensed frequency band information associated with each of one or more channels, information associated with the number of channel candidates, and channel candidate list information, and the channel candidate information may be received through a high layer signaling of the primary cell. Also, the channel candidate information may further include at least one of transmission power information of the secondary cell reference signal, transmission location information, and transmission period information.

The controller 910 may control the general operations of the UE 900 according to at least one embodiment of the present disclosure, the operations including: measuring a channel state of an unlicensed band channel based on the channel candidate information of the eNB; and performing carrier aggregation using a channel selected by the eNB.

In addition, the controller 910, the transmitting unit 920, and the receiving unit 930 may perform operations according to the embodiments of the present disclosure.

Figure 10:
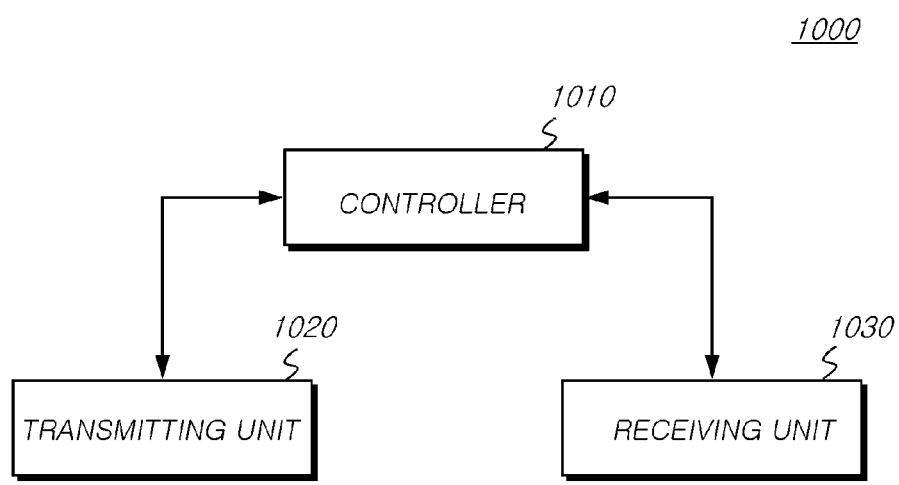
FIG. 10 is a block diagram illustrating a configuration of an eNB according to another embodiment of the present disclosure.

FIG. 10 is a block diagram illustrating a configuration of an eNB according to at least one embodiment of the present disclosure.

Referring to FIG. 10, an eNB 1000 according to at least one embodiment of the present disclosure may include: a transmitting unit 1020 configured to transmit, to a UE, channel candidate information of a secondary cell that uses an unlicensed frequency band; a receiving unit 1030 configured to receive channel state information associated with one or more channels, which are generated based on the channel candidate information; and a controller 1010 configured to additionally configure a channel having the smallest signal interference as the secondary cell of the UE, based on the channel state information.

The receiving unit 1030 may further receive channel information of a primary cell or reference signal measurement information associated with a secondary cell. The channel state information may include information associated with whether each of one or more channels is used or may include information associated with a signal strength.

The transmitting unit 1020 may further transmit, to the UE, a reference signal of the secondary cell. The channel candidate information may include at least one of unlicensed frequency band information associated with each of one or more channels, information associated with the number of channel candidates, and channel candidate list information, and the channel candidate information may be transmitted through a high layer signaling of the primary cell. The reference signal of the secondary cell may be a cell specific reference signal that is transmitted in a channel of the unlicensed frequency band by using physical cell identification information that is the same as that of the primary cell.

In addition, the transmitting unit 1020 and the receiving unit 1030 may be used for transmitting and receiving, to/from a UE, a signal or a message and data according to at least one embodiment of the present disclosure.

The controller 1010 may control the general operations of the eNB 1000 according to at least one embodiment of the present disclosure, the operations including selecting a channel of an SCell to be additionally configured for a UE through carrier aggregation by using channel state information or the location information of the UE, which is received from the UE.

Also, the controller 1010 may calculate the location information of the UE based on the channel information of the primary cell or the reference signal measurement information associated with the secondary cell. The controller 1010 may select a channel that is to be additionally configured as the secondary cell, based on the channel state information and the location information of the UE.

In addition, the controller 1010, the transmitting unit 1020, and the receiving unit 1030 may perform operations according to the embodiments of the present disclosure.

Although a preferred embodiment of the present disclosure has been described for illustrative purposes, those skilled in the art will appreciate that various modifications, additions, and substitutions are possible without departing from the scope and spirit of the invention as disclosed in the accompanying claims. Therefore, the embodiments disclosed in the present disclosure are intended to illustrate the technical idea of the present disclosure as opposed to limiting the technical idea, and the scope of the present disclosure is not limited by the embodiment. The scope of the present disclosure shall be construed on the basis of the accompanying claims in such a manner that all of the technical ideas included within the scope equivalent to the claims belong to the present disclosure.

CROSS-REFERENCE TO RELATED APPLICATION

This application claims priority from and the benefit under 35 U.S.C. § 119(a) of Korean Patent Application No. 10-2014-0101467, filed on Aug. 7, 2014, and No. 10-2015-0094846, filed on Jul. 2, 2015 which are hereby incorporated by reference for all purposes as if fully set forth herein. Also, when this application claims the priority benefit of the same Korean Patent Applications from countries in addition to the U.S., the invention will be incorporated herein by reference.

The invention claimed is:

1. A method for a user equipment (UE) to perform carrier aggregation (CA), the method comprising:
   receiving channel candidate information of a secondary cell that uses an unlicensed frequency band from a base station;
   receiving a reference signal of the secondary cell transmitted through one or more channels of the unlicensed frequency band from the base station;
   transmitting channel state information associated with the one or more channels, which are generated using the channel candidate information; and
   adding, as the secondary cell, an unlicensed band channel that the base station selects based on the channel state information,
   wherein the reference signal of the secondary cell is a cell specific reference signal generated using physical cell identification information that is configured for the secondary cell and is independent of physical cell identification information of a primary cell,
   wherein the channel state information includes i) a received signal strength indicator associated with each of the one or more channels and ii) information on whether each of the one or more channels is used, determined by the received signal strength indicator,
   wherein the channel candidate information includes at least one of unlicensed frequency band information associated with each of the one or more channels, information associated with the number of channel candidates, and channel candidate list information, and
   wherein the channel candidate information is received through a high layer signaling of the primary cell.

2. The method as claimed in claim 1, further comprising:
   transmitting at least one of channel information of the primary cell and reference signal measurement information associated with the secondary cell,
   wherein the base station selects the unlicensed band channel to be added as the secondary cell, by further using location information of the UE which is calculated based on at least one of the channel information of the primary cell and the reference signal measurement information associated with the secondary cell.

3. The method as claimed in claim 1, wherein the channel candidate information further includes at least one of transmission power information of a secondary cell reference signal, transmission location information, and transmission period information.

4. The method as claimed in claim 1, wherein the reference signal of the secondary cell is transmitted from the base station to the UE through all candidate channels associated with the channel candidate information.

5. A method for a base station to configure carrier aggregation (CA), the method comprising:
   transmitting, to a user equipment (UE), channel candidate information of a secondary cell that uses an unlicensed frequency band;
   transmitting, through one or more channels of the unlicensed frequency band, a reference signal of the secondary cell to the UE;
   receiving channel state information associated with the one or more channels, which are generated based on the channel candidate information; and
   additionally, configuring an unlicensed band channel having the smallest signal interference as a secondary cell of the UE, based on the channel state information,
   wherein the reference signal of the secondary cell is a cell specific reference signal generated using physical cell identification information that is configured for the secondary cell and is independent of physical cell identification information of a primary cell,
   wherein the channel state information includes i) a received signal strength indicator associated with each of the one or more channels and ii) information on whether each of the one or more channels is used, determined by the received signal strength indicator,
   wherein the channel candidate information includes at least one of unlicensed frequency band information associated with each of the one or more channels, information associated with the number of channel candidates, and channel candidate list information, and
   wherein the channel candidate information is received through a high layer signaling of the primary cell.

6. The method as claimed in claim 5, further comprising:
   receiving channel information of the primary cell or reference signal measurement information associated with the secondary cell; and
   calculating location information of the UE based on at least one of the channel information of the primary cell and the reference signal measurement information associated with the secondary cell,
   wherein the unlicensed band channel that is additionally configured as the secondary cell is selected based on the channel state information and the location information of the UE.

7. The method as claimed in claim 5, wherein the channel candidate information further includes at least one of transmission power information of the secondary cell reference signal, transmission location information, and transmission period information.

8. The method as claimed in claim 5, wherein the reference signal of the secondary cell is transmitted from the base station to the UE through all candidate channels associated with the channel candidate information.

9. A user equipment (UE) that performs carrier aggregation, the UE comprising:
   a receiving unit configured to receive, from a base station, channel candidate information of a secondary cell that uses an unlicensed frequency band and to receive a reference signal of the secondary cell transmitted through one or more channels of the unlicensed frequency band from the base station;
a transmitting unit configured to transmit channel state information associated with the one or more channels, which are generated using the channel candidate information; and
a controller configured to add, as the secondary cell, an unlicensed band channel that the base station selects based on the channel state information,
wherein the reference signal of the second cell is a cell specific reference signal generated using physical cell identification information that is configured for the secondary cell and is independent of physical cell identification information of a primary cell, and
wherein the channel state information includes i) a received signal strength indicator associated with each of the one or more channels and ii) information on whether each of the one or more channels is used, determined by the received signal strength indicator.

10. The UE as claimed in claim 9, wherein the transmitting unit further transmits channel information of the primary cell or reference signal measurement information associated with the secondary cell,
wherein the base station selects the unlicensed band channel to be added as the secondary cell, by further using location information of the UE that is calculated based on at least one of the channel information of the primary cell and the reference signal measurement information associated with the secondary cell.

11. The UE as claimed in claim 9, wherein the channel candidate information further includes at least one of transmission power information of a secondary cell reference signal, transmission location information, and transmission period information.

12. The UE as claimed in claim 9, wherein the reference signal of the secondary cell is transmitted from the base station to the UE through all candidate channels associated with the channel candidate information.

* * * * *